3,178,957
MOTION-TRANSMITTING DEVICE
Jack E. Martens, Gary, Ind., assignor to The Anderson Company, a corporation of Indiana
Filed June 7, 1962, Ser. No. 200,698
5 Claims. (Cl. 74—424.8)

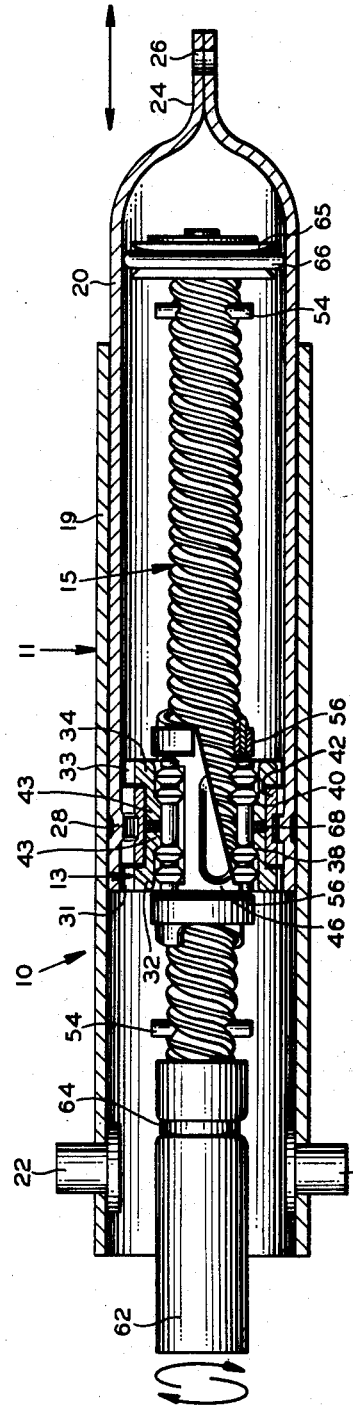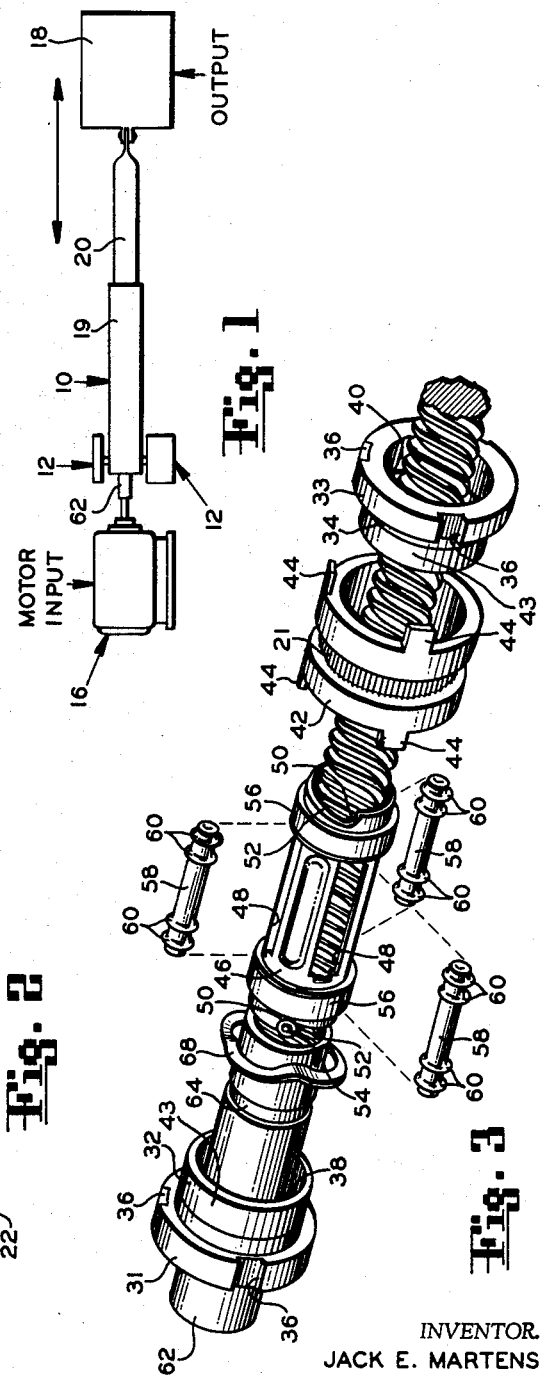

This invention relates to a motion-transmitting actuator having a screw and nut and is particularly concerned with an improved nut assembly.

An object of this invention is to provide an improved nut assembly for use on screws.

Another object of this invention is to provide an improved motion-transmitting actuator.

Other objects of this invention will manifest themselves upon the following description.

In the drawing:

FIGURE 1 is a schematic showing of a motor-driven actuator employing my improvement;

FIGURE 2 is a view of the complete actuator, nut and screw partially in cross section with parts cut away for clarity;

FIGURE 3 is an exploded perspective view of the nut assembly.

Referring to FIGURE 1 in the drawing, the numeral 10 designates a motion-transmitting mechanism or unit which is mounted to a stationary base or the like 12. Unit 10 is made up of telescoping housings 19 and 20, one of which is connected at one end to base 12 and receiving a rotatable driving screw therein. The other housing 20 is connected at its opposite end to a linear movable work load 18, and fixedly contains a nut for cooperation with the above-mentioned rotatable screw. Referring to FIGURE 2, it is clearly shown that a nut assembly 13 is axially and nonrotatably carried by the housings 20. Nut assembly 13 is adapted to receive the threads of helically threaded screw 15 for relative movement therealong upon rotation of the screw in either direction by a reversible motor 16.

Outer housing 19 is provided with studs 22 or the like for mounting to stationary base 12. The inner housing 20, at its exposed end, is flattened at 24 and provided with a hole 26 for attachment to a work load 18. The opposite end of tube 20 is adapted to receive nut member 13, as referred to above. The housings 19 and 20 are adapted to be pivotally connected to a stationary member 12 and output 18 respectively. Connections other than pivotal may be employed as well depending, of course, upon the use.

The nut member 13 includes a pair of hollow cylindrical sleeve members designated 32 and 34; these halves have radially enlarged or raised portions 31 and 33 at opposite outward extremities that are provided with linear slots 36 in their outer periphery as best shown in FIGURE 3. The external peripheral surface of the sleeves between the raised portions is cylindrical. The internal surface of each sleeve member 32 and 34 is provided with raceways 38 and 40, respectively, which face in opposite axial directions from the other.

A hollow cylindrical shaped cage member 46 is adapted to fit loosely within the sleeve members 32 and 34 and to encompass a portion of screw member 15. The cage 46 has a predetermined number of longitudinal openings 48 formed in the cylindrical walls and equally spaced about the circumference thereof. The carrier 46 has at its axial extremities ears 50 with a helical track 52 leading thereto. Ears 50 define peripheral abutments for respectively engaging pins 54 of screw member 15. Cage 46 is provided at each end with a pair of reinforcing rings 56 for additional support.

Elongate bearings or roller elements 58 are adapted to be seated in each opening 48. A pair of radially enlarged bearing surfaces 60 of the roller 58 are axially spaced apart a predetermined distance to span a preselected number of threads on screw 15 and mate with the threads and raceways 38 and 40 for driving contact therewith. Rollers 58 and their spaced-apart bearing surfaces 60 lie spaced about the periphery of the screw by reason of cage 46.

As previously mentioned, raceways 38, 40 are formed on separate sleeves 32, 34 respectively. A resilient member 68, in the form of an annular spring washer, is positioned between sleeves 32 and 34 for urging them apart in opposite axial directions. Raceways 38 and 40 are urged into bearing contact with spaced-apart bearing surfaces 60 of rollers 58. This resilient arrangement compensates for variation in thread lead of screw 15 and permits operation of rollers 58 thereon without substantial binding for greater efficiency. The radial peripheral portion of bearing surface 60 which is not in contact with an axial raceway 38, 40 contacts the cylindrical portion adjacent the raceways for radial load-bearing engagement. Rollers 58 may have single or multiple bearing surfaces 60 at each end.

A band or annular ring 42 having a cylindrical internal surface slidably receives cylindrical portions 43 of each sleeve 32, 34. Band 42 is positioned astride spring 68 and provides a linear guide for the sleeves in an axial direction under the action of spring 68, or other forces. Ring 42 is provided with radially spaced axially directed fingers 44 on each end thereof projecting in axially opposite directions to be slidably received in slots 36 of raised portions 31, 33 of sleeves 32, 34. The engagement between fingers 44 and slots 36 permits relative axial displacement between sleeves 32, 34 but restrains relative rotation therebetween.

The diameter of ring 42 is slightly greater than the diameter of adjacent portions 31 and 33. Ring 42 is provided with a knurled groove around the periphery thereof to provide a seat 21 to receive housing 20 in crimped engagement therewith as at 28. This engagement fixedly secures ring 42 to the housing while permitting relative axial movement of the sleeves 32, 34 with respect to the ring and to housing 20. It will be obvious that the sleeve halves 32, 34 are supported in a manner to prevent tilting of one relative to the other in any direction, or with respect to the ring.

It is obvious from FIGURE 2 that nut assembly 13 is maintained in an assembled position within housing 20. The sleeves, including raceways, are restrained from axial separation by reason of the raceways abutting bearing surfaces 60 of the rollers.

A sleeve 62 has a portion 64 crimped around screw 15 at one end. The opposite end of adapter 62 is connected to a reversible motor 16 or the like. Screw 15 has at its other end a disc-shaped nylon ring 65 with a V-groove in its outer periphery. A resilient O-ring 66 is seated within the V-groove for sliding contact with inside of housing 20 to provide stabilization of screw 15 therein. The O-ring 66 has a noise or vibration dampening effect as the rotation of screw 15 reciprocably drives nut 13 and housing 20 to move output 18.

Stop pins 54 as previously mentioned are provided on opposite ends of screw 15 for mating relation with ears 50 of the cage 46 whenever the nut reaches the end of its travel. This engagement limits relative rotation between the screw and cage and permits "freewheeling" of the nut on the screw without axial advancement.

In operation, rotation from the power input is transmitted through adapter 62 to screw member 15 causing it to rotate about its longitudinal axis. Nut member 13 is caused to travel linearly along the screw moving housing 20 therealong to move output 18.

The nut member 13 moves longitudinally along the axis of screw 15 until a respective ear 50 of cage 46 engages pin 54 which stops longitudinal movement and introduces "freewheeling." The "freewheeling" action permits continued rotation of screw 15 without linear output of nut 13 and housing 20. As the motor 16 is reversed, it reverses the bearing pressure of roller 58 causing reverse action or opposite telescopic movement of inner tube 20. Reverse action will continue until the opposite ear 50 of cage 46 engages opposite pin 54 again causing "freewheeling" at the completion of a full stroke.

The ends of ring 42 each lie in a plane transversely disposed with respect to the axis of the screw. These ends are adapted to abut like surfaces on adjacent portions 31, 33, respectively, depending upon the direction of rotation of screw 15 and the load applied thereto. The spacing between halves of sleeves 32, 34 is sufficient to allow ample space for spring 68 even when portions 31 and 33 are each contacting ring 42 at the same time. The clearance between ring 42 and adjacent portions 31, 33 is slight, preferably only a few thousandths of an inch. This spacing, of course, depends upon manufacturing requirements and tolerance maintained on the screw thread lead. During rotation of the screw and linear movement of the nut, it will be appreciated that there will be no space or clearance between the respective sleeve adjacent the trailing end of ring 42 as they are in driving contact.

Ring 42 provides stability to the two halves (sleeves 32, 34 including raceways 38 and 40) in all radial directions by reason of its completely surrounding a cylindrical portion 33 of each. Ring 42 further provides an axial thrust-carrying foundation or platform for contact with portions 31 and 33. The thrust load is completely distributed about the annular surface so as to eliminate any tilting effect on raceways 38 and 40.

Having thus described my invention, it is obvious that various modifications may be made in the same without departing from the spirit of the invention; and, therefore, I do not wish to be understood as limiting myself to the exact forms, constructions, arrangements and combinations of parts herein shown and described.

I claim:
1. A motion-transmitting mechanism comprising:
   screw means,
   a nut for the screw means being operatively connected thereto in driving relation by a plurality of elongate rollers having spaced-apart radially enlarged bearing surfaces engaging raceways on the nut and threading on the screw means and being spaced about the screw by cage means,
   said nut being of axially separate halves,
   said raceway being located on said separate halves of the nut,
   means urging the halves in opposite axial directions for resilient contact of the raceways and radially enlarged bearing surfaces,
   annular means for connecting said nut to an output sleeve,
   said annular means including an inner cylindrical surface for receiving a cylindrical portion of each of said separate halves to guide relative axial movement therebetween,
   said annular means including a plurality of annularly disposed axially extending fingers cooperating with complementary recesses in said halves to prevent relative rotation between said halves and said annular means.

2. A motion-transmitting mechanism comprising in combination:
   a helically threaded member,
   nut means operatively associated with said threaded member,
   said nut means including annular race means surrounding the helically threaded member and defining a space therebetween,
   said race means having a pair of spaced-apart annular raceways,
   said race means being split transversely between the raceways substantially perpendicular to the axis of the threaded member,
   elongate roller elements having spaced-apart radially enlarged bearing surfaces straddling the split in the race means and having bearing surfaces in contact with respective raceways and with threads of the helically threaded member,
   cage means disposed between the race means and the helically threaded member for spacing the elongate roller elements therebetween,
   means urging the separate race means in axially opposite directions for contact between the raceways and radially enlarged bearing surfaces,
   annular means having a cylindrical portion operative with the race means to permit relative axial movement therebetween,
   said annular means additionally including a plurality of axially extending fingers adapted to be slidably received in axially disposed recesses on said race means to prevent relative rotation between said race means and said annular means.

3. A motion-transmitting mechanism comprising in combination:
   inner and outer concentrically disposed relatively rotatable members,
   roller means interposed between said members for operatively connecting said relatively rotatable members,
   said roller means having an axis extending substantially parallel with the axes of said relatively rotatable members and having spaced-apart radially enlarged bearing surfaces,
   said outer relatively rotatable member being transversely separated with each part having raceways adjacent the radially enlarged bearing surfaces,
   means urging the separated portions of the outer relatively rotatable member in opposite axial directions for contact of said raceways with said bearing surfaces respectively.
   and annular means surrounding a portion of the outer relatively rotatable member for guiding the separated parts for relative axial separation under the action of said urging means,
   said annular means additionally including a plurality of axially extending fingers adapted to be slidably received in axially disposed recesses in said outer relatively rotatable members for preventing relative rotation therebetween,
   said annular means including a circumferential groove for circumferentially receiving a portion to have motion transmitted thereto.

4. Motion-transmitting mechanism comprising in combination:
   a first housing member and a second housing member telescopically received within the first member for relative linear adjustment,
   one of the members adapted to be anchored to a relatively fixed base and the other member adapted to be connected to a device to be positioned in infinite positions relative to the base,
   a helically threaded member disposed within the first and second members and adapted to be rotatably driven,
   nut means carried by said other member and cooperating with the threads of the helically threaded member whereby rotation of the helically threaded member moves the other member linearly,
   said nut means comprising annular race means surrounding the helically threaded nut and defining a space therebetween,
   said race means being transversely divided into two halves with each half being provided with a cylindrical portion adjacent each other, each half having an annularly disposed axially facing raceway facing in a direction opposite to that of the other, elongate rotatable elements each having spaced-apart radially enlarged bearing surfaces adapted to establish a driving arrangement between the raceways and the threads of the helically threaded member, cage means for peripherally spacing the elongate rotatable elements about the helically threaded member, means urging the halves of the race means in opposite axial directions for contact with the raceways and the radially enlarged bearing surfaces, and annular cylindrical means fixedly carried by the housing and encompassing the cylindrical portion of the race means to support the nut means therein, said annular cylindrical means additionally including a plurality of axially extending fingers adapted to be slidably received in axially disposed recesses on said race means to prevent relative rotation between said race means and said annular means.

5. In a motion-transmitting mechanism having a rotatable screw, an output member in the form of a sleeve and provided at one end with means for connection to an object to be moved, said sleeve encircling said screw and provided with nut means operable with said screw whereby rotary input of said screw is translated to linear output of said sleeve, said nut means including separate axially spaced halves, the improvement residing in annular means for carrying nut halves in said sleeve, said annular means comprising an inner cylindrical surface adapted to receive cylindrical portions of said halves for permitting relative axial positioning therebetween, circumferential groove means on said annular means adapted to be circumferentially received by said sleeve member, and a plurality of annularly disposed axially extending fingers on said annular means for cooperation with keyways on said nut halves to prevent relative rotation therebetween but permit said relative axial movement.

References Cited by the Examiner
UNITED STATES PATENTS

| | | | |
|---|---|---|---|
| 2,398,841 | 4/46 | Morris | 74—424.8 |
| 2,933,941 | 4/60 | Millns | 74—459 |
| 3,014,379 | 12/61 | Wise | 74—459 |
| 3,014,380 | 12/61 | Martens | 74—459 |

DON A. WAITE, *Primary Examiner.*